3,440,998
DIAL FOR ELECTRICAL APPARATUS
Edwin T. Lumb, 530 NW. 144th St., Miami, Fla. 33168
Filed Nov. 29, 1967, Ser. No. 686,499
Int. Cl. H03j 1/02
U.S. Cl. 116—124.1                                         8 Claims

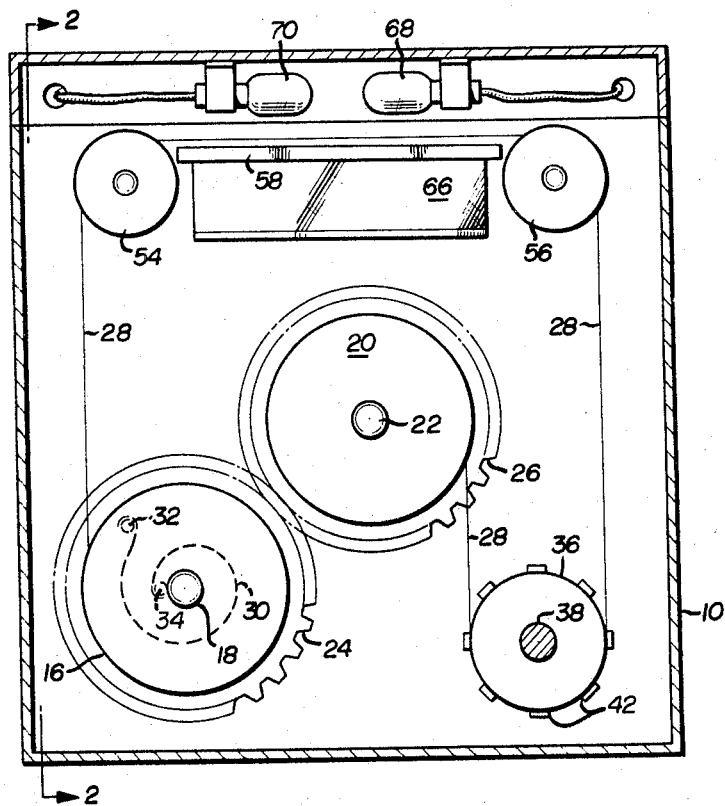
FIG. 1
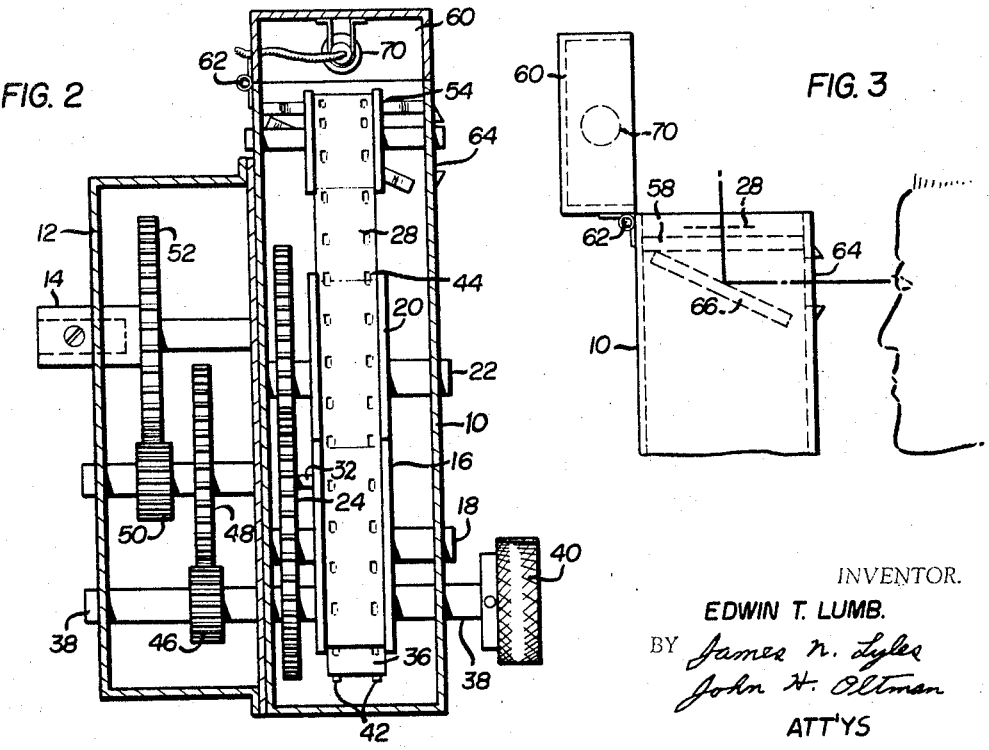
FIG. 2
FIG. 3
INVENTOR.
EDWIN T. LUMB.
BY James N. Lyles
John H. Oltman
ATT'YS

United States Patent Office 3,440,998
Patented Apr. 29, 1969

ABSTRACT OF THE DISCLOSURE

The dial mechanism of the present invention is useful for electrical apparatus, particularly radios, and includes first and second storage reels mounted for rotation in a housing with a rather long length of transparent film having one end affixed to one of the reels and the other end affixed to the other reel so that a substantial length of film may be wound on the reels. The film has dial markings or indicia on it, and an intermediate length of the film is supported in the housing at a position away from a window in the housing. Optical means such as a mirror or prism is associated with the window so that the intermediate film length can be viewed through the window.

---

Preferably, the intermediate film length is supported parallel to the top of the housing, and the housing top is removable to permit marking of the film with a scale on the top surface of the film. A mirror is provided under the film in alignment with the window to provide a right angle line of sight between the window and the film to permit viewing of the underside of the film. This arrangement does not invert the image of the dial scale. The mechanism also includes actuator means for driving the reels to pass the film past the viewing position, and this provides viewing of a great deal of dial scale in a small space. The actuator means may be coupled to a control member so that the control member is moved by the actuator to control the apparatus, and where the apparatus is a radio, to control the tuning of the radio.

Background of the invention

Many types of dial mechanisms have been proposed for use in radios and other electrical apparatus, and the dial mechanism used most frequently on radios has a pointer which moves along a dial scale as the radio is tuned. Since it is usually desirable to keep the radio small, and since the whole dial scale is visible, the dial scale has to be fairly compressed and therefore is difficult to read accurately. It has been proposed to provide a dial in which only a portion of the scale is viewed at one time, for example by using an endless loop of film rotatable past a window in the housing of the radio. However, even this does not provide as much scale as would be desirable for highly accurate reading of the dial.

Summary of the invention

The present invention provides a dial mechanism which uses transparent film marked with a dial scale with one end of the film affixed to one storage reel and the other end of the film affixed to another storage reel so that a substantial length of the film can be wound on one or both reels. An intermediate length of the film is viewed through a window so that a greatly expanded dial scale can be moved past the window by rotating the reels. This permits accurate reading of the scale. In one embodiment, the intermediate length of film is supported at the top of a housing which also encloses the reels, and the top of the housing is removable to permit marking the film with a dial scale on the top surface of the film. A window is provided in the front of the housing, and optical means such as a mirror or prism provides a right angle line of sight between the window and the intermediate film length for viewing the underside of the film to permit reading the scale. An upright image as viewed through the window is provided by this arrangement. The mechanism also includes actuator means for driving the reels to wind and unwind film, and the actuator is coupled to a control member which tunes the radio where the dial is used with a radio.

It is, accordingly, an object of the present invention to provide a greatly expanded dial scale for electrical apparatus.

Another object of the invention is to provide an expanded dial scale in a minimum of space.

A further object of the invention is to provide a dial mechanism wherein the dial scale is marked on a transparent film, the marking of the scale being done on one side of the film and the viewing of the scale being done on the other side of the film with optical means provided to permit viewing of the scale even though there is no straight line of sight between the viewing window and the film.

A further object of the invention is to provide a simple driving mechanism for rotating the storage reels to wind and unwind film as the electrical apparatus is controlled.

Other objects of this invention will appear in the following description and appended claims, reference being had to the accompanying drawings forming a part of this specification wherein like reference characters designate corresponding parts in the several views.

On the drawings:

FIGURE 1 is a sectional view of a dial mechanism in accordance with one embodiment of the invention;

FIGURE 2 is a cross sectional view taken along line 2—2 of FIGURE 1; and

FIGURE 3 is a schematic view of part of the housing for dial mechanism showing how the top of the housing may be removable to expose the film for marking and calibration purposes.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

The embodiment of the invention illustrated in the drawings includes a front housing 10 which encloses the portion of the dial mechanism which winds and unwinds film, and a back housing 12 which encloses the portion of the dial mechanism which drives a control member 14 which is adapted to be connected to the electrical apparatus being controlled. Where the apparatus is a radio, control member 14 rotates to tune the radio as by moving capacitor plates. In side housing 10 is a first storage reel 16 affixed to a shaft 18 which mounts reel 16 for rotation. Another storage reel 20 is mounted on a shaft 22 for rotation with the shaft. A gear 24 is affixed to shaft 18, and another gear 26 is affixed to shaft 22, the two gears 24 and 26 being in meshing engagement so that rotation of one of the storage reels to wind up film will rotate the other storage reel to unwind film.

A rather long length of transparent film 28 is connected to the reels 16 and 20, the length of the film in one embodiment being about four feet. It is clear that with a film this long, a greatly expanded radio dial can be provided. One end of film 28 is affixed to reel 16 and the other end is affixed to reel 20 so that as one reel winds up film the other unwinds film in the manner illustrated in FIGURE 1. Film will be wound up on reel 20 when it is rotated counter-clockwise and will be unwound when it is rotated clockwise. Similarly, film will be wound on reel 16 when it is rotated counter-clockwise and will be unwound from reel 16 when it is rotated clockwise. Reel 16 may be loosely mounted on shaft 18, and a torsion spring 30 may have one end 32 connected to reel 16 and the other end 34 connected to shaft 18 so that a torque is exerted by the spring between reel 16 and gear 24 in the proper direction to maintain film tension.

A sprocket pulley 36 is mounted on a shaft 38 which extends through housing 10 and has a portion available outside of the housing upon which a control knob 40 is mounted to allow rotation of shaft 38 by actuation of knob 40. The sprocket teeth 42 on pulley 36 engage in holes 44 near the edges of the film 28 so that sprocket pulley 36 is engaged with the film in driving relation. Rotation of sprocket 36 in the clockwise direction as viewed in FIGURE 1 unwinds film from reel 20 and winds film on reel 16, and conversely, counter-clockwise rotation of pulley 36 unwinds film from reel 20 and winds film on reel 16.

As viewed in FIGURE 2, the left-hand end of shaft 38 extends through housing 12, and inside housing 12 is a gear train including gears 46, 48, 50 and 52 which connect shaft 38 with the control member 14. The gear train referred to provides a substantial reduction so that many revolutions of shaft 38 are required for one revolution of control member 14. Thus, a long length of film can be moved past the viewing position for a relatively small change in the tuning of the radio where the dial mechanism is used on a radio.

An intermediate length of film 28 passes about idler pulleys 54 and 56 so that the intermediate film length is supported parallel to the top of housing 10. The film passes over and is supported on a transparent plate 58 which is affixed to housing 10 and is also parallel to the top of the housing. As may be seen in FIGURE 3, the top portion 60 of the housing 10 is pivotally connected by a hinge 62 to the remainder of the housing so that the housing portion 60 can be removed from the top of the housing, that is, merely pivoted away from the housing, to expose the top surface of the film 28. With the film exposed in this manner, a dial scale can be marked on the film in calibration with the tuning of the radio. Once the dial scale has been marked, housing portion 60 is replaced to close the top of the housing, and the housing would normally remain closed in the use of the dial mechanism.

A window 64 is provided in the front side of the housing, and a mirror or prism 66 is placed at a 45 degree angle relative to the line of sight through window 64 so that the underside of film 28 may be viewed with a right angle line of sight by looking through the window 64. Lamps 68 and 70 may be provided in the top housing portion 60 to illuminate film 28 from its top side, and this is part of the optical system which makes viewing of the film possible. The image which appears when viewing through the window 64 is an upright image due to the fact that the film is marked on its top side and viewed at its underside.

Thus a compact dial mechanism is provided which affords viewing of a great deal of dial scale while using only a small space for storage of film on which the film is marked. The marking of the film on its top side and viewing of the film on its underside provide a convenient way of viewing the film without inverting the image. The use of storage reels to wind and unwind film, rather than merely having an endless loop of film driven around pulleys, allows the use of a longer length of film in a small space. A simple drive mechanism for rotating the reels is also provided.

Having thus described my invention, I claim:

1. A dial mechanism for electrical apparatus including in combination, a first storage reel, a second storage reel, means mounting said first and second storage reels for rotation in a vertical plane with the axes thereof horizontal, an elongated transparent film for receiving indicia thereon to provide a dial for said apparatus, one end of said film being affixed to said first reel and the other end of said film being affixed to said second reel so that a substantial length of film may be wound on one or both of said reels, housing means enclosing said reels and said film having a horizontal top side and a vertical viewing side with said viewing side having a window therein for viewing said film, means for supporting a length of said film intermediate said ends horizontally and parallel to said top side of said housing means above said window, said top side of said housing means being removable to expose said intermediate film length to be marked with indicia for calibration purposes, optical means associated with said window permitting viewing of said intermediate film length through said window, actuator means having a portion inside said housing for driving said reels and a portion outside said housing available for actuation, means connecting said actuator means to drive said reels to pass said film over said support means therefor, a movable control member adapted to be connected to said apparatus for controlling the same, and means coupling said actuator to said control member for moving the same in response to actuation of said actuator means.

2. The dial mechanism of claim 1 in which said optical means includes a mirror positioned below said intermediate film length at an angle of about 45 degrees relative to the line of sight through said window.

3. The dial mechanism as claimed in claim 2 in which said optical means further includes illumination means positioned above said intermediate film length so that, in operation, said indicia are visible through said window in an upright sense.

4. The dial mechanism as claimed in claim 3 in which said supporting means for said intermediate film length comprises transparent plate means underlying and supporting said film through which said film is visible.

5. The dial mechanism as claimed in claim 1 in which said first and second reels have coupling means interconnecting the same so that as one of said reels rotates to wind up film the other said reel rotates to unwind film.

6. The dial mechanism as claimed in claim 5 in which said actuator means includes pulley means in said housing engaged with said film in driving relation and operable by actuation of the portion of said actuator means outside said housing to unwind film from one of said reels and wind film onto the other of said reels by rotation of said reels.

7. The dial mechanism as claimed in claim 6 in which said portion of said actuator means outside said housing comprises a rotary control knob.

8. The dial mechanism of claim 1 in which said apparatus is a radio, said mounting means mounts said reels with the axes thereof extending transversely of said front and back sides, said reels have coupling means interconnecting the same so that as one of said reels rotates to wind up film, the other of said reels rotates to unwind film, and said actuator means includes pulley means in said housing engaged with said film in driving relation and operable by actuation of the portion of said actuator means outside said housing to unwind film from one of said reels and wind film on to the other of said reels by rotation of said reels.

References Cited

UNITED STATES PATENTS

| | | | |
|---|---|---|---|
| 1,787,298 | 12/1930 | Ziola | 116—124.1 |
| 1,860,678 | 5/1932 | Langlet | 116—124.1 |
| 2,058,641 | 10/1936 | Slonczewski | 116—124.1 |
| 2,963,940 | 12/1960 | Raabe | 352—129 XR |

FOREIGN PATENTS

| | | |
|---|---|---|
| 411,713 | 6/1934 | Great Britain. |
| 20,378 | 8/1929 | Netherlands. |

LOUIS J. CAPOZI, *Primary Examiner.*

U.S. Cl. X.R.

352—129